(12) United States Patent
Yoshioka

(10) Patent No.: US 11,249,708 B2
(45) Date of Patent: Feb. 15, 2022

(54) IMAGE FORMING APPARATUS, IMAGE FORMING METHOD AND RECORDING MEDIUM

(71) Applicant: Tatsuroh Yoshioka, Kanagawa (JP)

(72) Inventor: Tatsuroh Yoshioka, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/851,487

(22) Filed: Apr. 17, 2020

(65) Prior Publication Data

US 2020/0356331 A1 Nov. 12, 2020

(30) Foreign Application Priority Data

May 9, 2019 (JP) .............................. JP2019-089226

(51) Int. Cl.
*G06F 3/12* (2006.01)
*H04N 1/00* (2006.01)

(52) U.S. Cl.
CPC ....... *G06F 3/1296* (2013.01); *H04N 1/00244* (2013.01)

(58) Field of Classification Search
CPC ...... G06F 3/1296; G06F 3/122; G06F 3/1204; G06F 3/1285; G06F 3/1228; G06F 3/1257; H04N 1/00244
USPC ....................................................... 358/1.15
See application file for complete search history.

(56) References Cited

U.S. PATENT DOCUMENTS

| 10,250,719 B2 * | 4/2019 | Kato .................. H04N 1/00307 |
| 10,255,099 B2 * | 4/2019 | Tsirkin ................ G06F 9/45558 |
| 2001/0055124 A1 * | 12/2001 | Varga ..................... G06K 15/00 358/1.15 |
| 2005/0262274 A1 * | 11/2005 | Aoki ..................... G06F 3/1258 710/15 |
| 2007/0036598 A1 * | 2/2007 | Toda .................. G03G 15/5062 400/62 |
| 2011/0279859 A1 * | 11/2011 | Hashimoto ........ H04N 1/00344 358/1.15 |
| 2012/0147422 A1 * | 6/2012 | Honma ................. G06F 3/1226 358/1.15 |
| 2013/0114107 A1 * | 5/2013 | Park ..................... G06F 3/1204 358/1.15 |
| 2013/0335763 A1 * | 12/2013 | Mizutani ............... G06F 3/1298 358/1.13 |
| 2014/0189116 A1 | 7/2014 | Niimura |

(Continued)

FOREIGN PATENT DOCUMENTS

| JP | 2014-130588 | 7/2014 |
| JP | 2016-025636 | 2/2016 |
| JP | 2017-024272 | 2/2017 |

*Primary Examiner* — Jerome Grant, II

(74) *Attorney, Agent, or Firm* — Harness, Dickey & Pierce, P.L.C.

(57) ABSTRACT

An image forming apparatus includes: a print engine to perform printing; a memory that stores a plurality of print conditions set for each of a plurality of direct printing methods; and circuitry to: receive print information on printing to be performed, the print information at least indicating image data to be printed; identify a direct printing method from the print information; acquire from the memory at least one print condition corresponding to the identified direct printing method; and control the print engine to perform printing based on image data according to the acquired print condition.

11 Claims, 9 Drawing Sheets

(56) References Cited

U.S. PATENT DOCUMENTS

| | | |
|---|---|---|
| 2014/0189117 A1 | 7/2014 | Niimura |
| 2014/0288677 A1* | 9/2014 | Sato ..................... G05B 19/409 |
| | | 700/83 |
| 2014/0376011 A1* | 12/2014 | Yamada ................ G06F 3/1207 |
| | | 358/1.9 |
| 2016/0028911 A1* | 1/2016 | Morita ................. H04N 1/0001 |
| | | 358/1.15 |
| 2017/0251080 A1* | 8/2017 | Kato ....................... H04W 4/50 |
| 2018/0129669 A1* | 5/2018 | Krakirian ............... G06F 16/738 |
| 2018/0157447 A1* | 6/2018 | Nakamura ............. G06F 3/1231 |
| 2018/0165045 A1* | 6/2018 | Hagiwara ............. G06F 3/1238 |
| 2019/0220235 A1* | 7/2019 | Inoue ................... G06F 3/1204 |
| 2020/0031111 A1* | 1/2020 | Yamamuro ......... B41F 33/0009 |

* cited by examiner

IMAGE FORMING APPARATUS, IMAGE FORMING METHOD AND RECORDING MEDIUM

CROSS-REFERENCE TO RELATED APPLICATIONS

This patent application is based on and claims priority pursuant to 35 U.S.C. § 119(a) to Japanese Patent Application No. 2019-089226, filed on May 9, 2019, in the Japan Patent Office, the entire disclosure of which is hereby incorporated by reference herein.

BACKGROUND

Technical Field

The present invention relates to an image forming apparatus, an image forming method, and a recording medium.

Description of the Related Art

There has been known a direct printing method for directly transmitting print data from a terminal (host) device to a printing device for printing, without intervening a printer driver that converts image data into the print data in a format compatible with the printing device. As the direct printing method, for example, "AirPrint", "Mopria (registered trademark)", and "Google Cloud Print (registered trademark)" are known.

Also, there has been known an image forming apparatus which requests additional information from a terminal (host) device for specifying a print condition when a direct printing request is issued from the terminal (host) device to the image forming apparatus.

However, in the direct printing method such as "Mopria (registered trademark)", "AirPrint", and "Google Cloud Print (registered trademark)", the print condition can only set in the range applicable to the operation system (OS) or the printing application program of the terminal (host) device. Therefore, it is difficult to set a desired detailed print condition.

On the other hand, it is possible to set the desired detailed print condition for printing at the printing device.

However, if the print condition is set at the printing device, unless the print condition is overwritten in printer job language (PJL) or command, a problem that the print condition set on the printing device itself is applied to all printing.

SUMMARY

Example embodiments includes an image forming apparatus, including: a print engine to perform printing; a memory that stores a plurality of print conditions set for each of a plurality of direct printing methods; and circuitry to: receive print information on printing to be performed, the print information at least indicating image data to be printed; identify a direct printing method from the print information; acquire from the memory at least one print condition corresponding to the identified direct printing method; and control the print engine to perform printing based on image data according to the acquired print condition.

BRIEF DESCRIPTION OF THE SEVERAL VIEWS OF THE DRAWINGS

A more complete appreciation of the disclosure and many of the attendant advantages and features thereof can be readily acquired and understood from the following detailed description with reference to the accompanying drawings, wherein.

Figure 1:
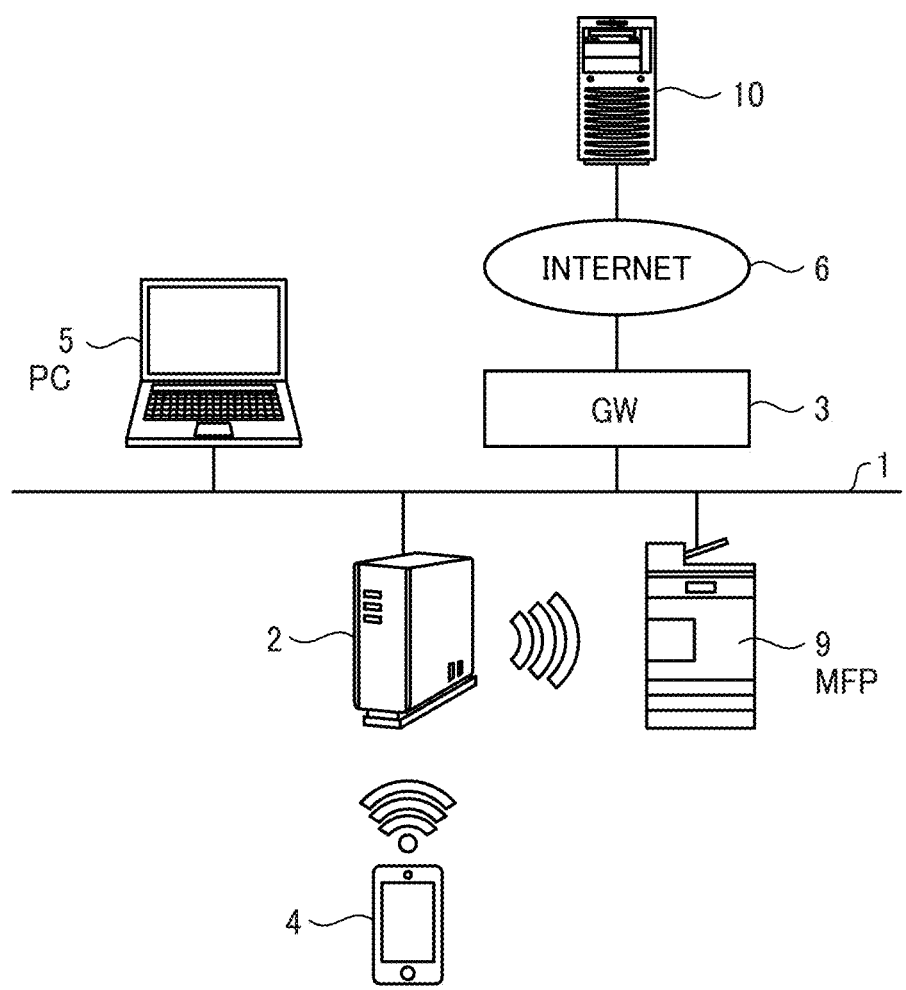
FIG. 1 is a diagram illustrating a system configuration of an image forming system according to an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, an image forming system according to an embodiment of the present invention will be described in detail with reference to the accompanying drawings.

FIG. 1 is a diagram illustrating a system configuration of an image forming system according to an embodiment of the present invention. As illustrated in FIG. 1, the image forming system according to an embodiment of the present invention includes an access point 2 for a wireless local area network (LAN), a gateway (GW) 3, a wireless communication terminal device 4, a personal computer (PC) 5, a multifunction peripheral (MFP) 9, and a server 10.

The access point 2, the GW 3, the PC 5, and the MFP 9 are connected to a private network 1 such as an LAN, and can communicate with one another. The single access point 2, the single GW 3, the single PC 5, and the single MFP 9 may be connected to the private network 1. Further, a plurality of the access points 2, a plurality of the PCs 5, and a plurality of the MFPs 9 may be connected to the private network 1.

The GW 3 is connected to the server 10 via a wide area network 6 such as the Internet. The wireless communication terminal device 4 may be, for example, a smart phone or a tablet terminal device. The wireless communication terminal device 4 performs wireless communication with the MFP 9 via the access point 2 by wireless communication such as Wi-Fi (registered trademark).

Figure 2:
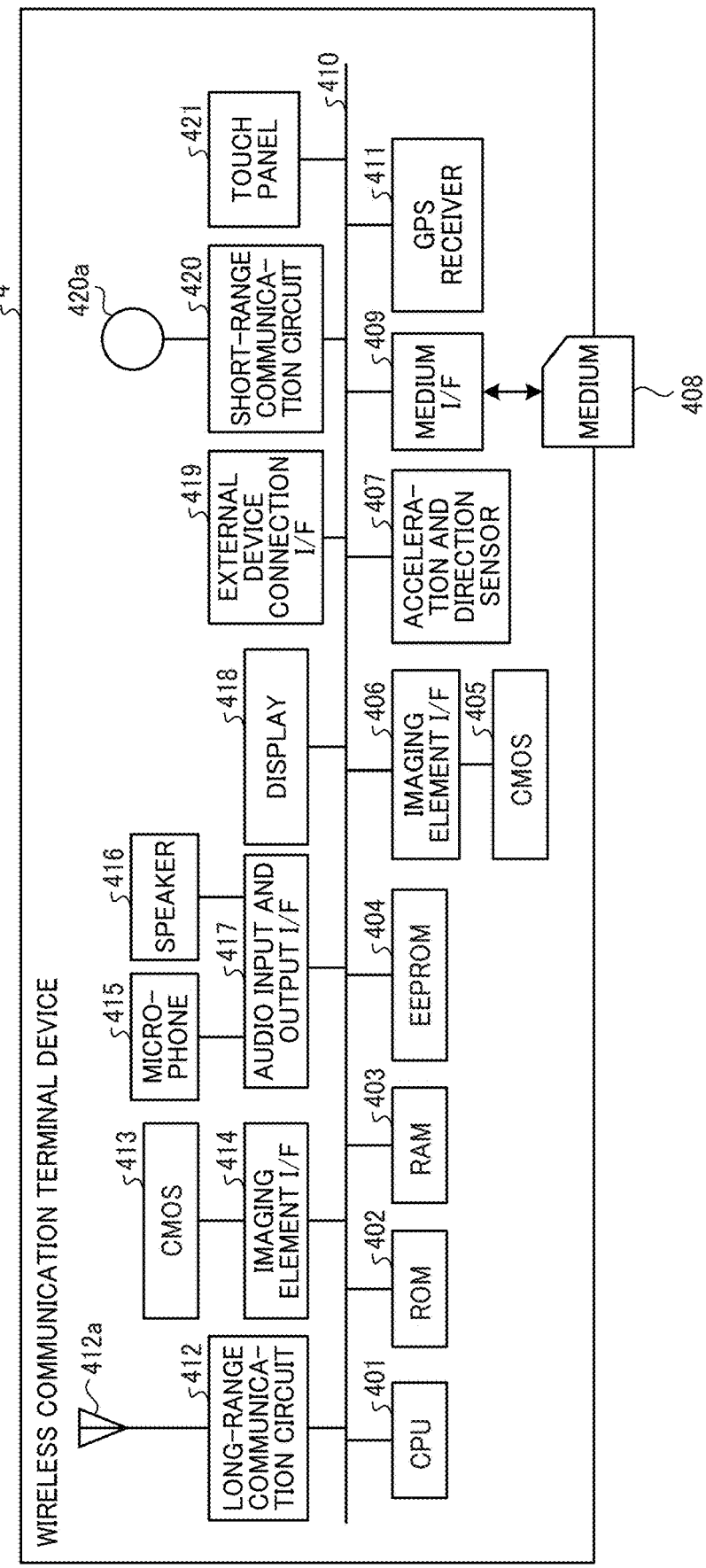
FIG. 2 is a diagram illustrating a hardware configuration of a wireless communication terminal device in the image forming system according to the embodiment of the present invention.

FIG. 2 is a diagram illustrating a hardware configuration of the wireless communication terminal device 4. As illustrated in FIG. 2, the wireless communication terminal device 4 includes a central processing unit (CPU) 401, a read only memory (ROM) 402, a random access memory (RAM) 403, an electrically erasable programmable read-only memory (EEPROM) 404, a complementary metal oxide semiconductor (CMOS) sensor 405, an imaging element interface (I/F) 406, an acceleration and direction sensor 407, a medium interface 409, and a global positioning system (GPS) receiver 411.

The CPU 401 controls entire operation of the wireless communication terminal device 4. The ROM 402 stores a program used for executing the CPU 401, such as an initial program loader (IPL). The ROM 402 stores a print processing program for direct printing, which enables the wireless communication terminal device 4 to directly transmit print data to a printing device to perform printing, without intervening a printer driver for converting the print data to have a format compatible with the printing device.

The RAM 403 is used as a work area for the CPU 401. Various data such as a program for a portable terminal is read from or written to the EEPROM 404 under control of the CPU 401.

The CMOS sensor 405 generates image data corresponding to imaging light from a subject under control of the CPU 401. Another imaging device such as a charge coupled device (CCD) image sensor may be provided in addition to or in place of the CMOS sensor.

The imaging element I/F 406 is an interface for coupling the CMOS sensor 405 to a bus line 410. The acceleration and direction sensor 407 is a sensor such as an electronic magnetic compass for detecting geomagnetism, a gyrocompass, or an acceleration sensor. The medium I/F 409 is an interface for coupling a recording medium 408 such as a flash memory to the bus line 410. Data is written to and read from the recording medium 408 via the medium I/F 409. The GPS receiver 411 receives GPS signals from GPS satellites.

The wireless communication terminal device 4 includes a long-range communication circuit 412, a CMOS sensor 413, an imaging element I/F 414, a microphone 415, a speaker 416, an audio input and output I/F 417, a display 418, an external device connection I/F 419, a short-range communication circuit 420, an antenna 420a for the short-range communication circuit 420, and a touch panel 421.

The long-range communication circuit 412 communicates with a device on the wide area network 6 such as the Internet via a wireless base station. The CMOS sensor 413 captures an image of a subject under control of the CPU 401 to generate image data. The imaging element I/F 414 is an interface for coupling the CMOS sensor 413 to the bus line 410. The microphone 415 generates an audio signal that is an electric signal corresponding to collected sounds. The speaker 416 outputs audio, such as music or voice, corresponding to the audio signal. The audio input and output IF 417 executes input and output processing of the audio signal for the microphone 415 and the speaker 416 under control of the CPU 401.

The display 418 may be implemented by, for example, a liquid crystal display or an organic electro luminescence (EL) display. The display 418 displays an image of a subject, various icons, or the like. The external device connection I/F 419 is an interface for coupling various external devices. The short-range communication circuit 420 performs short-range communication according to such as near field communication (NFC) and Bluetooth (registered trademark). The short-range communication circuit 420 performs wireless LAN communication with the MFP 9 via the access point 2. The touch panel 421, which may be formed of such as a transparent electrode, is provided on the display 418, and detects a user's contact operation.

The wireless communication terminal device 4 includes the bus line 410. The bus line 410 may be an address bus or a data bus for electrically coupling each component such as the CPU 401 in FIG. 4.

Figure 3:
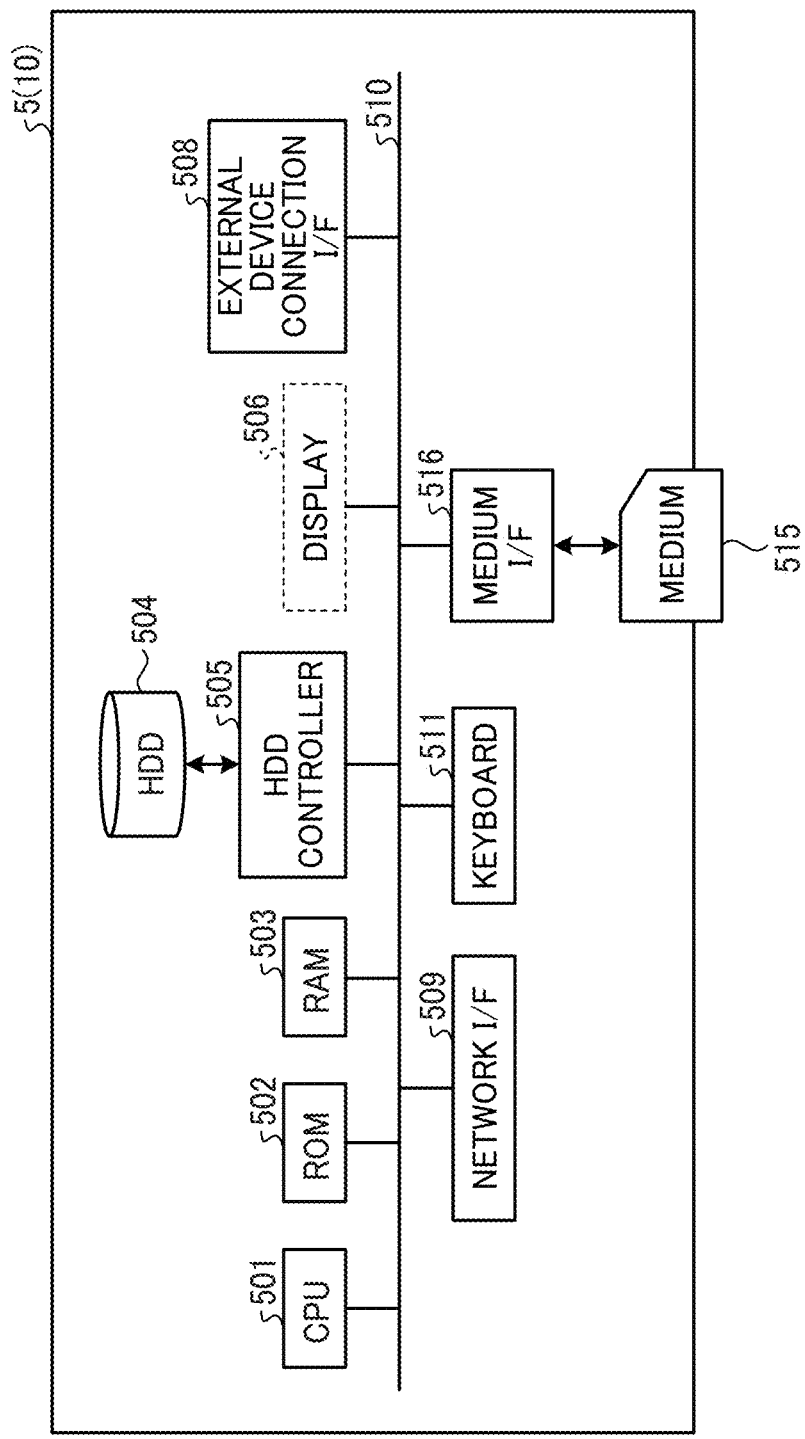
FIG. 3 is a diagram illustrating a hardware configuration of a personal computer and a server in the image forming system according to the embodiment of the present invention.

In this example, the PC 5 and the server 10 have substantially the same hardware configuration as illustrated in FIG. 3. That is, each of the PC 5 and the server 10 has a CPU 501, a ROM 502, and a RAM 503 as illustrated in FIG. 3. Each of the PC 5 and the server 10 further includes a hard disk drive (HDD) 504, an HDD controller 505, an external device connection I/F 508, a network IF 509, a bus line 510, a keyboard 511, and a medium I/F 516. In this example, the display 506 is provided on the PC 5, and is not provided on the server 10.

The CPU 501 controls entire operation of the server 10. The ROM 502 stores a program used for executing the CPU 501 such as the IPL. The RAM 503 is used as a work area for the CPU 501. The HDD 504 stores various data such as a program. The HDD controller 505 controls writing and reading of various data to the HDD 504 under control of the CPU 501. The display 506 displays various information such as a cursor, a menu, a window, a character, and an image.

The external device connection I/F 508 is an interface for coupling various external devices such as a universal serial bus (USB) memory or a printer. The network IF 509 is an interface for performing data communication via a communication network 100. The bus line 510 is an address bus line or a data bus line for electrically coupling each component such as the CPU 501.

The keyboard 511 has a plurality of keys that allow a user to input a character, a numerical value, various instructions, and the like. The pointing device 512 performs input operations such as selecting and executing various instructions, selecting a processing target, and moving a cursor. The medium I/F 516 controls writing (storing) or reading of data to a recording medium 515 such as a flash memory. In this example, the keyboard 511 and the pointing device 512 are provided on the PC 5, and are not provided on the server 10.

Figure 4:
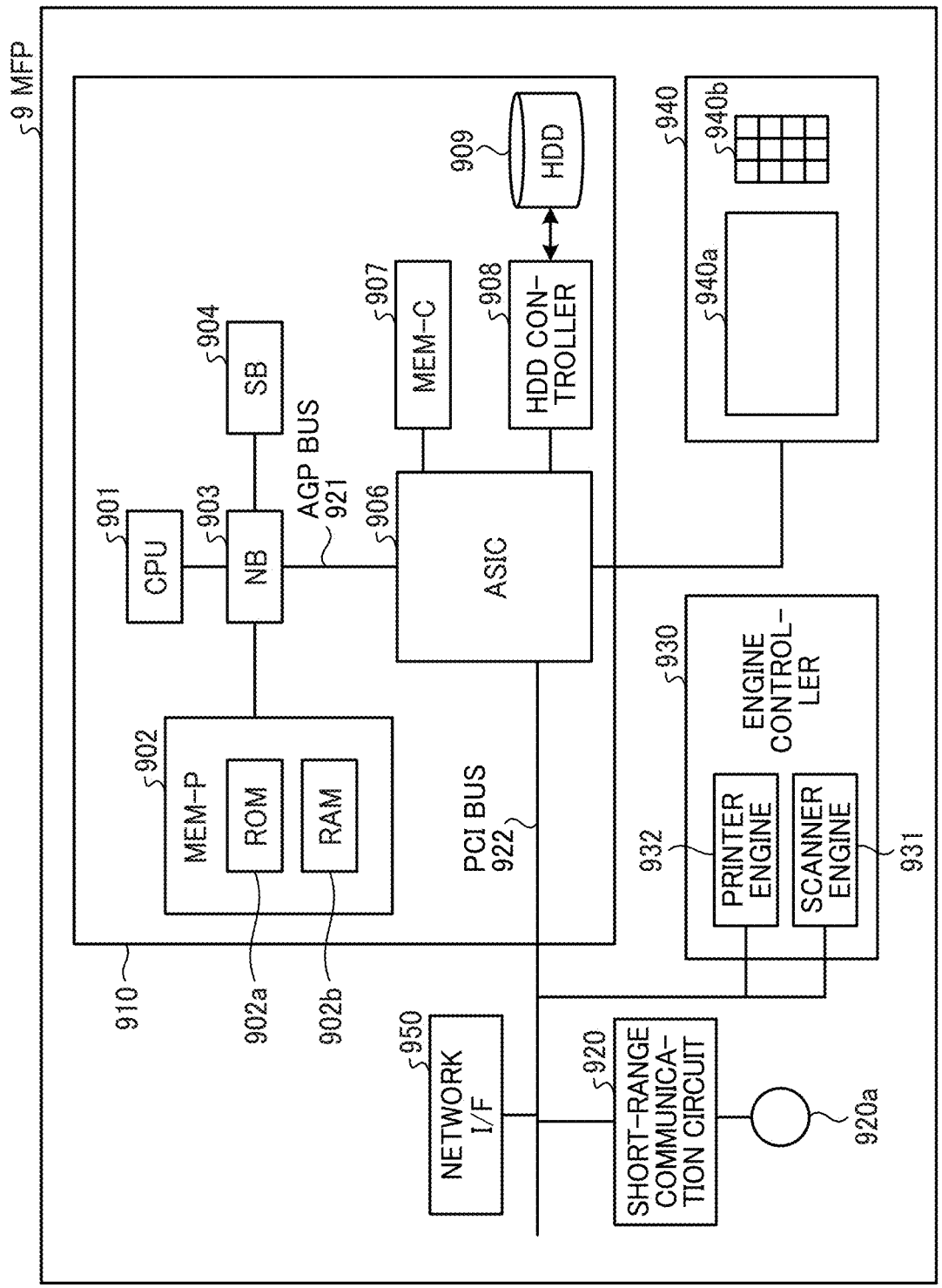
FIG. 4 is a diagram illustrating a hardware configuration of a multifunction peripheral (MFP) in the image forming system according to the embodiment of the present invention.

FIG. 4 is a diagram illustrating a hardware configuration of the MFP 9 as an example of the image forming apparatus. As illustrated in FIG. 4, the MFP 9 includes a controller 910, a short-range communication circuit 920, an engine controller 930, an operation panel 940, and a network I/F 950.

The controller 910 includes a CPU 901, a system memory (MEM-P) 902, a north bridge (NB) 903, a south bridge (SB) 904, an application specific integrated circuit (ASIC) 906, a local memory (MEM-C) 907, an HDD controller 908, and an HDD 909 (an example of a storage). The NB 903 and the ASIC 906 are coupled by an accelerated graphics port (AGP) bus 921.

The CPU 901 is a controller that executes the entire control of the MFP 9. The NB 903 is a bridge for coupling the CPU 901 with the MEM-P 902, the SB 904, and the AGP bus 921. The NB 903 includes a memory controller that controls reading and writing to the MEM-P 902, a peripheral component interconnect (PCI) master, and an AGP target.

The MEM-P 902 includes a ROM 902a, which is a memory for storing a program or data to implement each function of the memory controller, a RAM 902b used for decompressing a program or data, and as a drawing memory for memory printing. The program stored in the RAM 902b may be provided by being recorded in a computer-readable recording medium such as a compact disk read only memory (CD-ROM), a compact disc-recordable (CD-R), or a digital versatile disc (DVD) with a file in an installable format or an executable format.

The SB 904 is a bridge for coupling the NB 903 with PCI devices and peripheral devices. The ASIC 906 is an integrated circuit (IC) for image processing that has a hardware element for image processing. Further, the ASIC 906 has a role of a bridge for coupling the AGP bus 921, the PCI bus 922, the HDD controller 908, and the MEM-C 907, respectively.

The ASIC 906 includes a memory controller for controlling a PCI target, an AGP master, an arbiter (ARB) that is the core of the ASIC 906, and the MEM-C 907. The ASIC 906 includes a plurality of direct memory access controllers (DMACs) each of which rotates an image using a hardware logic, for example, and a PCI unit that performs data transfer between a scanner engine 931 and a printer engine 932 via the PCI bus 922. The ASIC 906 may be coupled to a USB interface or an institute of electrical and electronics engineers (IEEE) 1394 interface.

The MEM-C 907 is a local memory used as a copy image buffer and a code buffer. The HDD 909 is a storage for storing image data, storing font data used for printing, and storing a form. The HDD 909 controls writing and reading of data to the HDD 909 under control of the CPU 901. As will be described in detail later, the HDD 909 stores an image processing program that can set a detailed print condition for each direct printing method such as "AirPrint", "Mopria (registered trademark)", and "Google Cloud Print (registered trademark)".

The AGP bus 921 is a bus interface for a graphics accelerator card to accelerate graphic processing. The AGP bus 921 can directly access the MEM-P 902 with a high throughput to accelerate the graphics accelerator card.

The short-range communication circuit 920 is a communication circuit such as NFC and Bluetooth (registered trademark). Furthermore, the engine controller 930 includes the scanner engine 931 and the printer engine 932 (an example of a printer engine).

The operation panel 940 includes a display device 940a such as a touch panel for displaying a current set value or a selection screen and receiving an input from a user. The operation panel 940 includes an operation device 940b having a numeric keypad for inputting a setting value for a condition regarding image forming such as a condition for setting density and a start key for instructing a copy start.

The controller 910 controls the entire MFP 9, and performs processing such as drawing (rendering) control, communication control, and input from the operation panel 940. The scanner engine 931 or the printer engine 932 has an image processing function such as error diffusion processing and gamma conversion processing.

The MFP 9 can sequentially switch between document box function, copy function, printer function, and facsimile function to execute the functions, by using an application switching key on the operation panel 940. The MFP 9 enters a document box mode when the document box function is selected, and a copy mode when the copy function is selected. The MFP 9 enters a printer mode when the printer function is selected, and a facsimile mode when the facsimile function is selected.

The network IF 950 is an interface for performing data communication using the communication network 100. The short-range communication circuit 920 and the network I/F 950 are electrically coupled to the ASIC 906 via the PCI bus 922.

Figure 5:
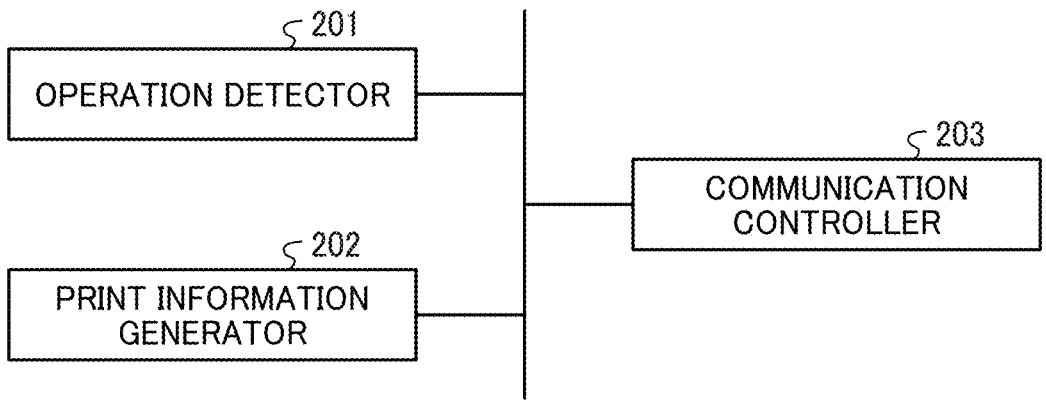
FIG. 5 is a functional block diagram of each function implemented by executing a direct printing application program of the wireless communication terminal device.

FIG. 5 is a functional block diagram illustrating each function implemented by the CPU 401 in the wireless communication terminal device 4 executing the print processing program for direct printing stored in the ROM 402. As illustrated in FIG. 5, the CPU 401 in the wireless communication terminal device 4 executes the print processing program to implement each function of the operation detector 201, the print information generator 202, and the communication controller 203.

The operation detector 201 detects such as an operation for designating direct printing and an operation for selecting image data for direct printing, by the user via the touch panel 421. The print information generator 202 generates information on print data subject to direct printing, such as information on image data selected by the user. The communication controller 203 transmits the print information for direct printing to the MFP 9 via the access point 2 for the wireless LAN, and the LAN 1.

Figure 6:
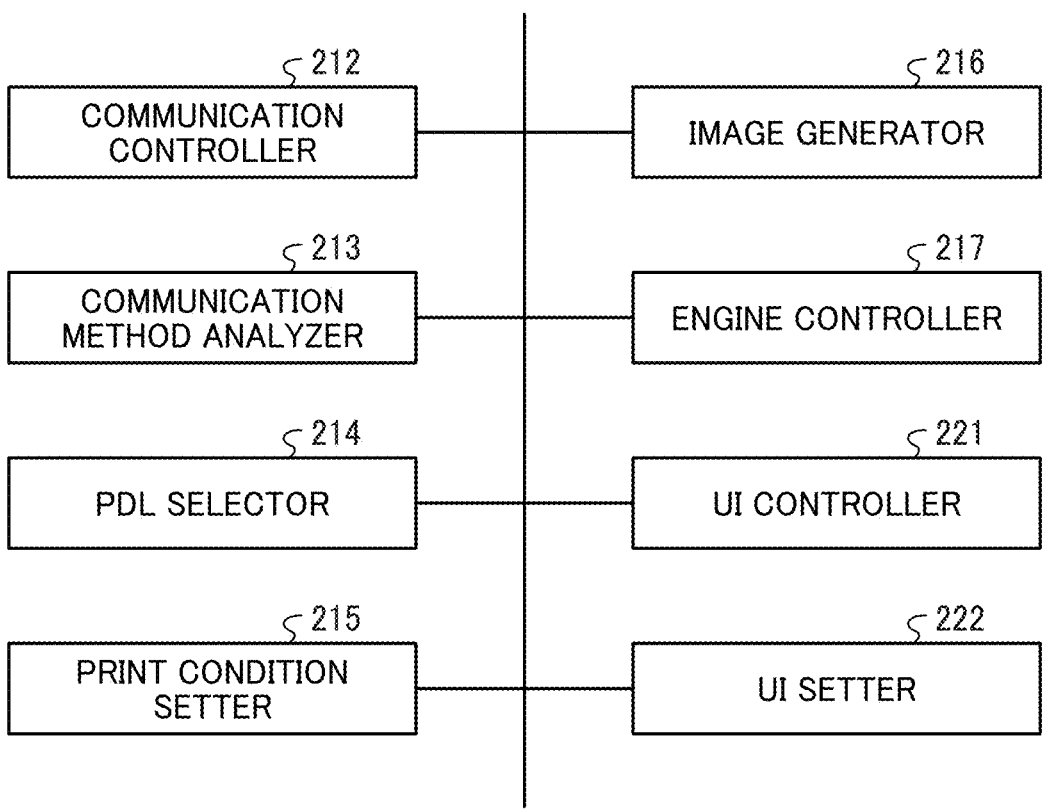
FIG. 6 is a functional block diagram of each function realized by executing a print control program of the MFP.

The CPU 901 in the MFP 9 executes the image processing program stored in the HDD 909 to control the execution of the print processing according to the print condition set for each direct printing method. In other words, the CPU 901 executes the image processing program stored in the HDD 909, to implement each function of a communication controller 212, a communication method analyzer 213, a page description language (PDL) selector 214, and a print condition setter 215, as illustrated in FIG. 6. The CPU 901 executes the image processing program to implement each function of an image generator 216, an engine controller 217, a user interface (UI) controller 221, and an UI setter 222.

The communication controller 212 controls the network I/F 950 to receive the print information for direct printing transmitted from the wireless communication terminal device 4. The communication method analyzer 213 analyzes a direct printing method such as "AirPrint", "Mopria (registered trademark)", and "Google Cloud Print (registered trademark)", based on the received print information for direct printing.

The PDL selector 214 selects the PDL type to be used based on the received print information for direct printing. The print condition setter 215 sets the direct printing method and the print condition corresponding to the selected PDL type, which are analyzed based on the received print information for direct printing.

The image generator 216 generates image data for printing (printing job data) from the received print information for direct printing based on the PDL type selected by the PDL selector 214. The engine controller 217 (an example of a print controller) corresponds to the engine controller 930 in FIG. 4, and controls the printer engine 932 to print an image corresponding to the print job data generated by the image generator 216. The UI controller 221 controls input processing and display processing of the operation panel 940 (an example of an operation device). The UI setter 222 manages the settings entered via the operation panel 940.

Figure 7:
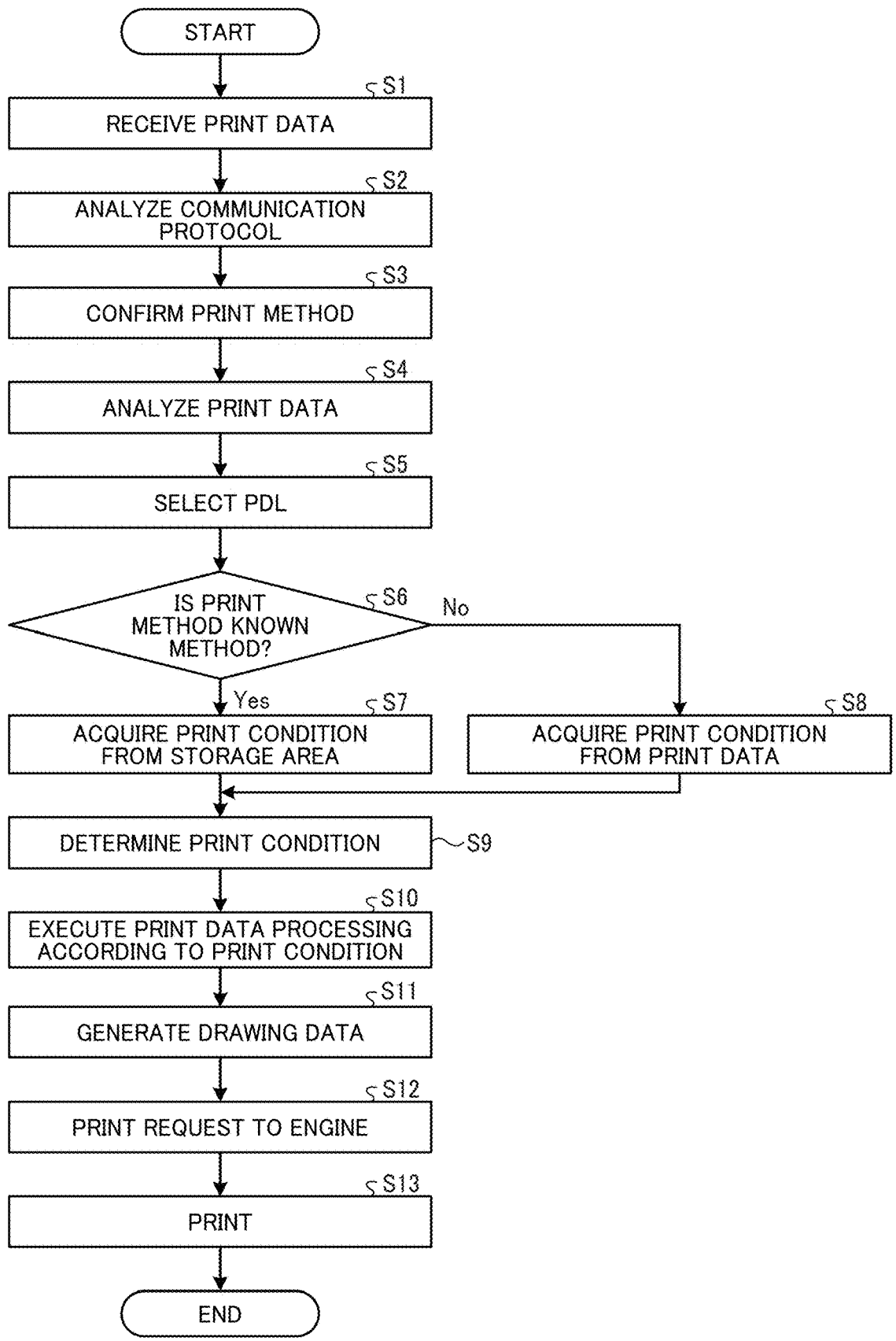
FIG. 7 is a flowchart illustrating direct printing processing in the MFP, which is provided in the image forming system according to the embodiment of the present invention.
Figure 8:
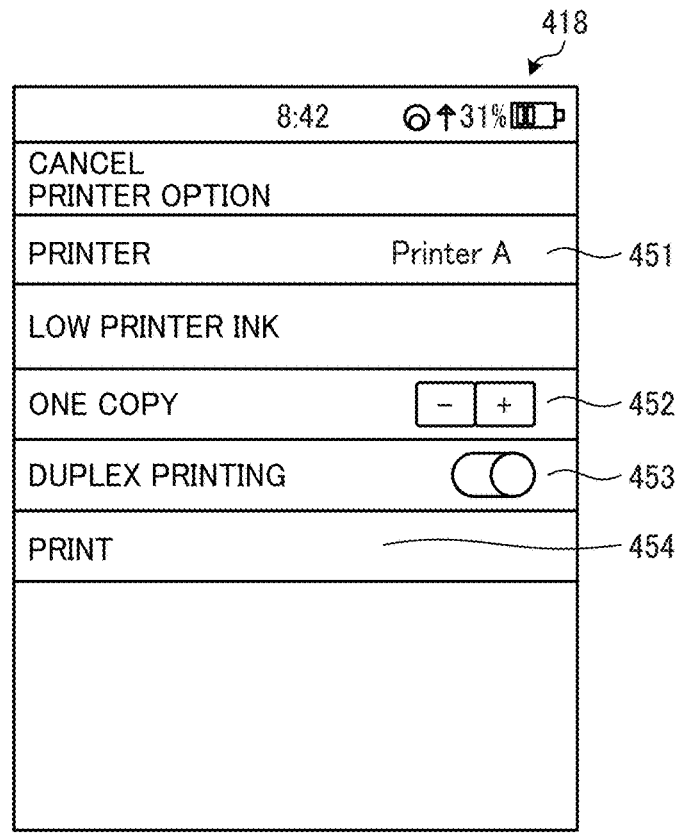
FIG. 8 is a diagram illustrating an example of a setting screen for setting a print condition for direct printing in the wireless communication terminal device, which is provided in the image forming system according to the embodiment of the present invention.

FIG. 7 is a flowchart illustrating direct print processing performed by the MFP 9. In step S1, the communication controller 212 in the MFP 9 controls the network I/F 950 to receive print information for direct printing transmitted from the wireless communication terminal device 4. Specifically, FIG. 8 is an example of an input screen for direct printing in the wireless communication terminal device 4. The user operates the touch panel 421 to select the desired image data subjected to direct printing from the image data stored in the storage such as the recording medium 408, and instructs the direct printing for the selected image data.

The instruction for direct printing is detected by the operation detector 201 in the wireless communication terminal device 4. The print information generator 202 controls the display of the input screen for direct printing illustrated in FIG. 8 on the display 418 when the operation detector 201 detects the instruction for direct printing. As an example of an input screen for direct printing, a display area 451 of the printer name of the currently selected printer (model number), an input button 452 for the number of print copies, a designation button 453 for duplex printing, and a print start instruction button 454 are displayed, as illustrated in FIG. 8.

The user selects the desired printer for direct printing, the number of print copies, and whether to perform duplex printing, and operates the print start instruction button 454. When the operation detector 201 detects the operation of the print start instruction button 454, the communication controller 203 associates the image data for which direct printing has been designated by the user, the printer for the printing, information on the number of print copies, and information indicating whether to perform duplex printing with one another, etc., to generate print information. The communication controller 203 further adds, to the print information, information on a format such as portable document format (PDF), joint photographic experts group (JPEG) and tagged image file format (TIFF) corresponding to the direct printing method such as "AirPrint", "Mopria (registered trademark)" and "Google Cloud Print (registered trademark)". The communication controller 203 transmits the print information to the MFP 9 via the short-range communication circuit 420. The print information transmitted from the wireless communication terminal device 4 is transmitted from the access point 2 to the MFP 9 via the LAN 1.

Next, when the MFP 9 receives the print information, the communication method analyzer 213 (an example of a detector) in the MFP 9 analyzes the communication protocol used for transmission of the print information in step S2, and detects the direct printing method used in step S3. As an example, the communication method analyzer 213 detects that the direct printing method of "AirPrint" is used when the Internet printing protocol (IPPS) is used for transmission of the print information. In another example, the communication method analyzer 213 detects that the direct printing method of "Google Cloud Print (registered trademark)" is used when a notification of the job state is transmitted to the server device for the Google (registered trademark).

Next, in steps S4 and S5, the PDL selector 214 analyzes the print information received from the wireless communication terminal device 4, and selects a PDL to be used for printing. The following language (PJL) for controlling a printer job is normally added to the print condition designated by the print information, based on the direct printing method.

PJLSETJOBNAME=TEST.PDF
PJLSETCOPIES=1
PJLSETTRAY=ALL

Next, in step S6, the print condition setter 215 determines whether the detected direct printing method is a known direct printing method. When the detected direct printing method is a known direct printing method (Step S6: Yes), the print condition setter 215 acquires the print setting corresponding to the current direct printing method set by the operation panel 940 in the MFP 9 in step S7 from the storage such as the HDD 909, and determines the print condition in step S9. In this case, the print condition setter 215 (an example of an acquisitor) discards the print condition designated in the received print information (referring to FIG. 8), and preferentially applies the print condition acquired from the HDD 909. As will be described later, the print condition set by the wireless communication terminal device 4 and the print condition set by the MFP side may be used in combination.

Figure 9:
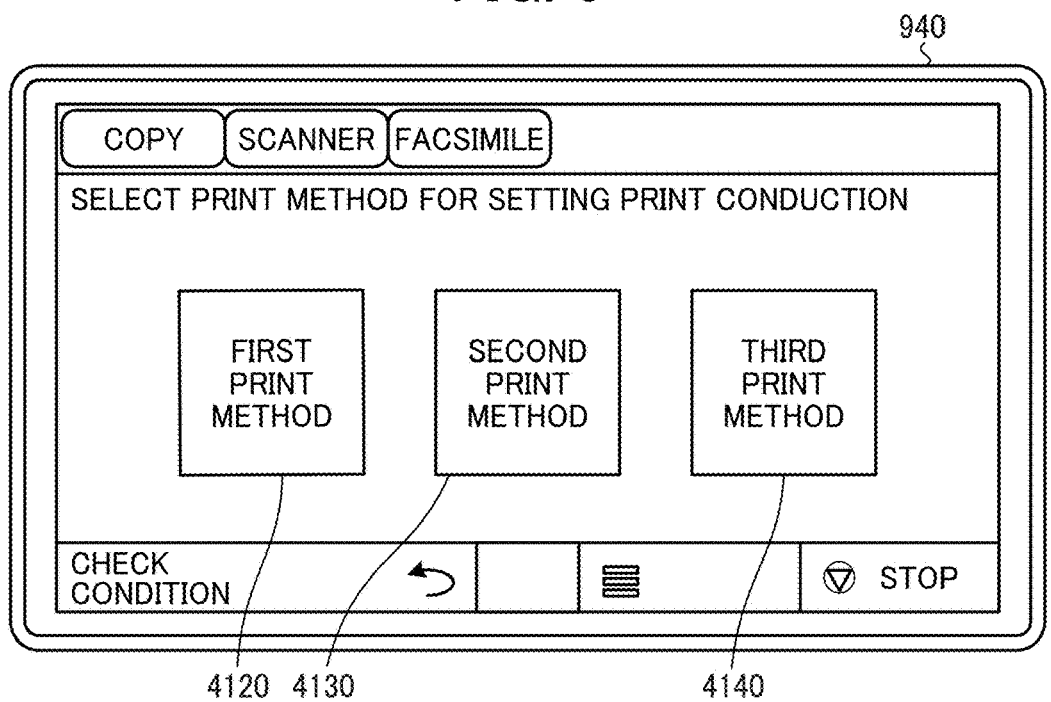
FIG. 9 is a diagram illustrating an example of an initial screen of a setting screen for setting the print condition for the direct printing in the MFP, which is provided in the image forming system according to the embodiment of the present invention.

That is, in the case of the image forming system according to an embodiment of the present invention, the print condition is set in advance for each direct printing method, and the setting information is stored in the storage such as the HDD 909. More specifically, the user operates the operation panel 940 in the MFP 9 in advance to designate the display of the setting screen for the print condition for each direct printing method. When the display of the setting screen for the print condition for each direct printing method is designated, the UI controller 221 controls the operation panel 940 to display the setting screen for the print condition for each direct printing method illustrated in FIG. 9, for example. The example of the setting screen in FIG. 9 is an example in which selection buttons 4120 to 4140 for the first to third printing methods are displayed. The selection button 4120 for the first print mode is operated, for example, when the direct printing method of "AirPrint" is selected. The selection button 4130 for the second print mode is operated, for example, when the direct printing method of "Mopria (registered trademark)" is selected. The selection button 4140 for the third print mode is operated, for example, when the direct printing method of "Google Cloud Print (registered trademark)" is selected.

Figure 10:
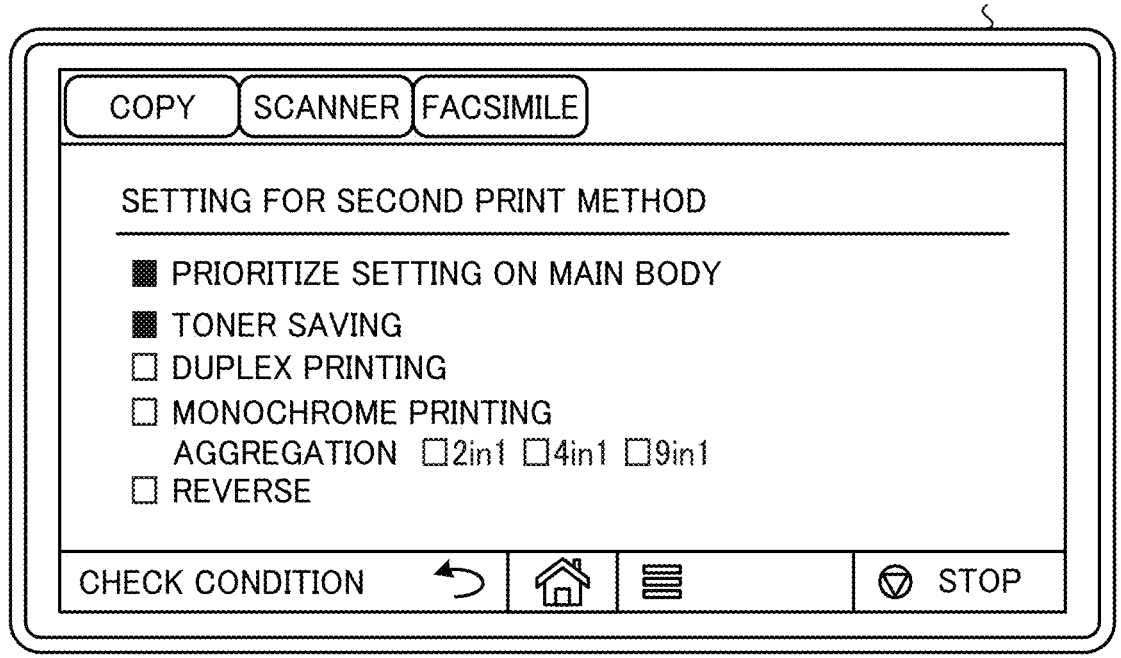
FIG. 10 is a diagram illustrating an example of the setting screen for setting the print condition for the direct printing in the MFP, which is provided in the image forming system according to the embodiment of the present invention.

For example, when the selection button 4120 for the first print mode corresponding to the direct printing method of "AirPrint" is operated, the UI controller 221 displays the print setting screen for "AirPrint" as illustrated in FIG. 10. The example of the print setting screen in FIG. 10 includes a selection item for selecting whether to give priority to the print condition set on the MFP side and a selection item for selecting whether to perform toner saving processing. The example of the print setting screen in FIG. 10 includes a selection item for selecting whether to perform duplex printing, a selection item for selecting whether to perform monochrome printing or color printing, a selection item to select whether to perform aggregation processing (2 in 1, 4 in 1, 9 in 1), and a selection item for selecting whether to perform reverse order printing in which the output order of printed matter is reversed.

Figure 11:
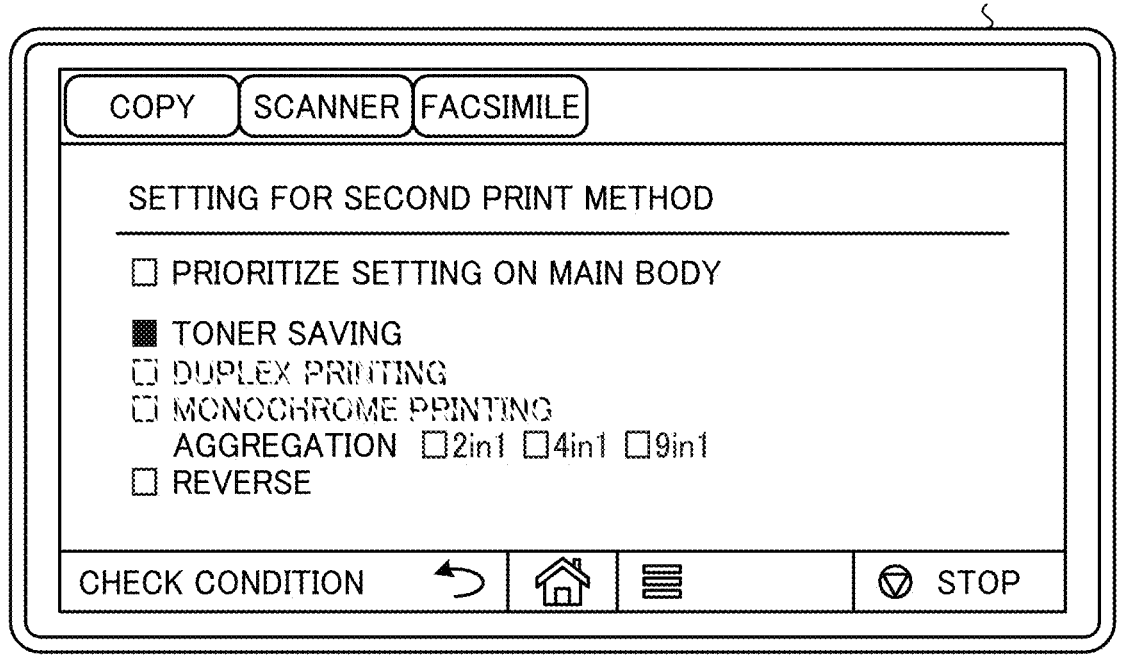
FIG. 11 is a diagram illustrating another example of the setting screen for setting the print condition for the direct printing in the MFP, which is provided in the image forming system according to the embodiment of the present invention.

The example in FIG. 10 is an example in which the setting on the MFP 9 side is prioritized and the toner saving is selected. On the other hand, the example in FIG. 11 is an example in which the setting on the wireless communication terminal device 4 side is prioritized and the toner saving is selected.

Figure 12:
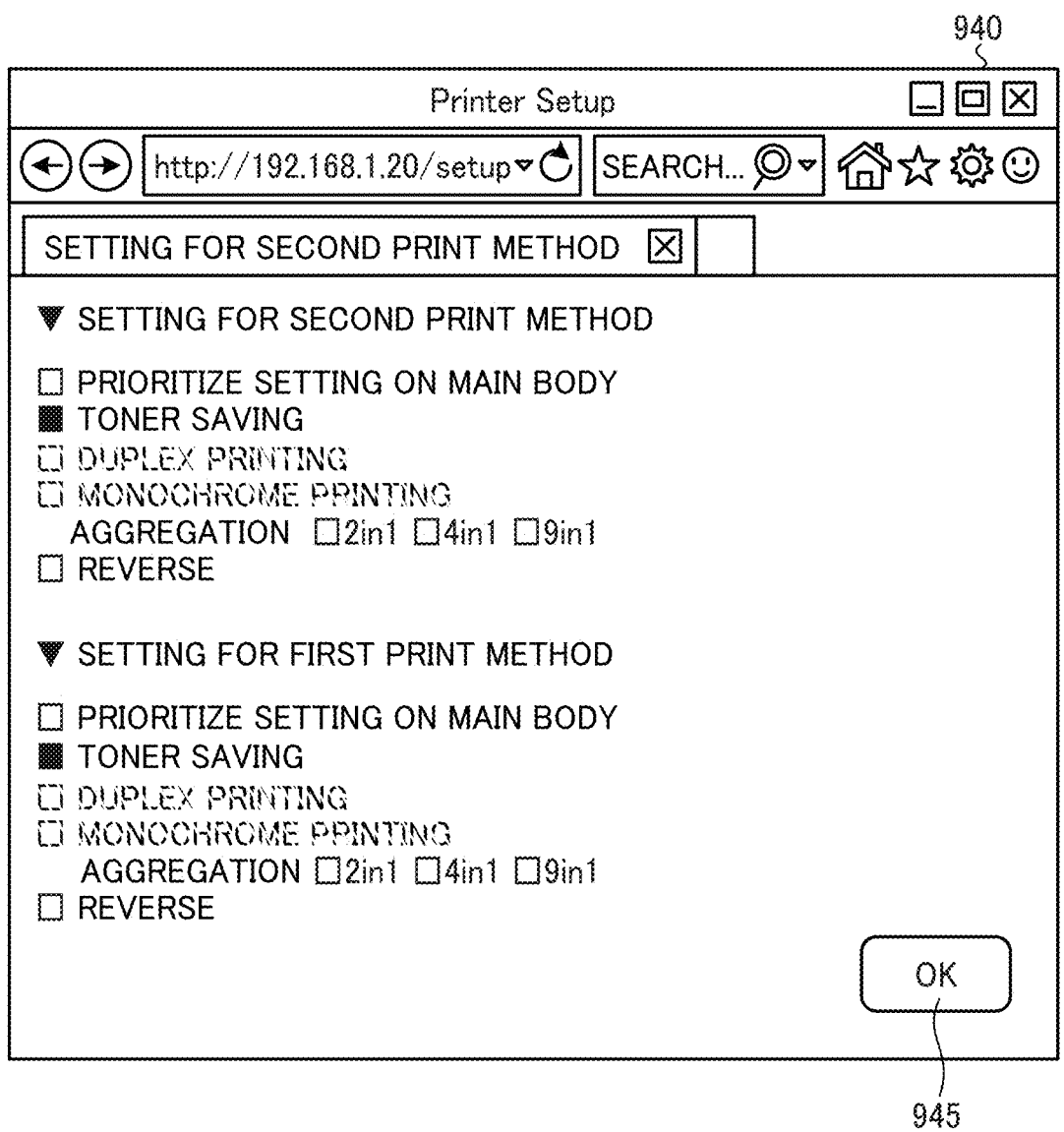
FIG. 12 is a diagram for describing an operation for setting the print condition for the direct printing performed by a web browser of a personal computer in the image forming system according to the embodiment of the present invention.

The setting of the print condition can be performed by operating the operation panel 940 in the MFP 9, and also through a web browser of the PC 5 (an example of an external device). FIG. 12 is an example of a setting screen for the print condition displayed on the web browser of the PC 5. When the user of the PC 5 accesses the MFP 9 via the web browser and designates the setting of the print condition, the setting screen for the print condition in FIG. 12 is transmitted from the MFP 9, and the setting screen for the print condition on the MFP 9 side is displayed via the web browser of the PC 5 as illustrated in FIG. 12.

The example of FIG. 12 is an example in which the setting item for the second direct printing method such as "Mopria (registered trademark)" and the setting item for the first direct printing method such as "AirPrint" are displayed. In the same way as described above, the user of the PC 5 sets the setting item for setting whether to give priority to the setting on the MFP 9 side and the setting item for setting whether to perform toner saving, and then operates a transmission button 945. Thus, the print condition set by the user is transmitted from the PC 5 to the MFP 9 via the wide area network 6 and the GW 3.

The print condition setter 215 in the MFP 9 stores the print condition set via the operation panel 940 or the web browser of the PC 5 in the storage such as the HDD 909. Thus, the storage such as the HDD 909 stores the print condition for each direct printing method. In step S6, the print condition setter 215 acquires the print condition corresponding to the detected known direct printing method from the storage, and determines the print condition in step S9.

When any direct printing method cannot be detected in step S3 (step S6: No), the print condition setter 215 acquires the print condition (referring to FIG. 8) set in the wireless communication terminal device 4 side from the print information received from the wireless communication terminal device 4 in step S8, and determines the acquired print condition as the print condition in step S9.

The above example is an example in which all print conditions are set on the MFP 9. However, a print condition other than the print condition set on the wireless communication terminal device 4 may be set on the MFP 9. For example, the example illustrated in FIG. 8 is an example in which each print condition for setting the number of print copies and whether to perform duplex printing can be set on the wireless communication terminal device 4. However, the MFP 9 can set a print condition other than each print condition for setting the number of print copies and whether to perform duplex printing set on the wireless communication terminal device 4. The print condition setter 215 stores the print condition received from the wireless communication terminal device 4 and the print condition set on the MFP 9 in the storage such as the HDD 909, as the print condition corresponding to the direct printing method of the wireless communication terminal device 4. Thus, it is possible to prevent an inconvenience in which the setting for the print condition on the wireless communication terminal device 4 becomes useless.

Next, in step S10, the image generator 216 executes print processing according to the determined print condition using the PDL, and generates drawing data (print job data) in step S11. Then, in step S12, the engine controller 217 transmits the drawing data (print job data) to the printer engine 932 and issues a print request. As a result, in step S13, the image is printed under the print condition set for each direct printing method, and all the processing of the flowchart in FIG. 7 is completed.

As is apparent from the above description, the image forming system according to the embodiment sets in advance the detailed print condition for each direct printing method at the MFP 9. The MFP 9 analyzes the communication protocol of the print information received from the wireless communication terminal device 4, and detects the direct printing method to be used. Then, the MFP 9 performs printing under the print condition set for the detected direct printing method.

Accordingly, the image forming system according to the embodiment can perform printing under the print condition set in detail for each direct printing method. Therefore, for example, when an unspecified number of users print in a company, the image forming system according to the embodiment can print with the selection of an appropriate print condition for each direct printing method used in the wireless communication terminal device 4 of the user. In other words, the image forming system according to the embodiment can perform printing under the print condition uniquely determined for each direct printing method. Accordingly, the image forming system according to the embodiment can perform an operation for uniquely determining the print condition for a print request from an unspecified number of users.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:
1. An image forming apparatus, comprising:
a print engine configured to perform direct printing;
a memory that stores a plurality of print conditions set for each of a plurality of direct printing methods, the plurality of print conditions include at least one of toner saving, number of pages, duplex printing, aggregation processing, monochrome printing, color printing or reverse order processing; and
circuitry configured to:

receive print information on printing to be performed, the print information at least indicating image data to be printed and a method of direct printing;

identify the received direct printing method from the print information;

acquire from the memory at least one print condition corresponding to the identified direct printing method; and control the print engine to perform printing based on image data according to the acquired print condition, wherein the print information designates at least one print condition, and wherein the circuitry of the image forming apparatus discards the at least one print condition designated by the received print information, and preferentially acquires the at least one print condition stored in the memory of the image forming apparatus and executes printing using the preferentially acquired at least one print condition.

2. The image forming apparatus of claim 1, wherein the circuitry identifies the direct printing method based on a communication protocol used for transmission of the print information.

3. The image forming apparatus of claim 1, further comprising:

an operation device configured to receive a user operation, wherein the circuitry stores at least one of the plurality of print conditions set for at least one of the direct printing methods in the memory, based on information input via the operation device.

4. The image forming apparatus of claim 1, further comprising:

an interface configured to communicate with an extraneous source via a network, wherein the circuitry stores at least one of the plurality of print conditions set for at least one of the direct printing methods in the memory, based on information received via the extraneous source.

5. The image forming apparatus of claim 1, further comprising:

an operation device configured to receive a user operation; and an interface configured to communicate with an extraneous source, wherein the circuitry stores, in the memory, at least one of the plurality of print conditions having been set at the image forming apparatus based on information input via the operation device, and additionally stores, in the memory, at least one of the plurality of print conditions having been set at the extraneous source based on information input via the interface, the at least one of the plurality of print conditions set at the image forming apparatus being different than the at least one of the plurality of conditions set at the extraneous source.

6. An image forming method, performed by an image forming apparatus, comprising:

storing, in a memory of the image forming apparatus, a plurality of print conditions set for each of a plurality of direct printing methods, the plurality of print conditions including at least one of toner saving, number of pages, duplex printing, aggregation processing, monochrome printing, color printing or reverse order processing;

receiving print information on printing to be performed, the print information at least indicating image data to be printed and a direct printing method;

identifying the received direct printing method from the print information;

acquiring from the memory at least one print condition corresponding to the identified direct printing method; and printing based on image data according to the acquired print condition, wherein the print information designates at least one print condition, the method further comprising;

discarding the at least one print condition designated by the print information;

preferentially acquiring the at least one print condition stored in the memory; and executing printing using the preferentially acquired at least one print condition.

7. The image forming method of claim 6, wherein the identifying includes identifying the direct printing method based on a communication protocol used for transmission of the print information.

8. The image forming method of claim 6, further comprising:

receiving a user operation via an operation device provided on the image forming apparatus, wherein the storing includes storing at least one of the plurality of print conditions set for at least one of the direct printing methods in the memory, based on information input via the operation device.

9. The image forming method of claim 6, further comprising:

receiving information from an extraneous source via a network, wherein the storing includes storing at least one of the plurality of print conditions set for at least one of the direct printing methods in the memory, based on the information received via the extraneous source.

10. The image forming method of claim 6, further comprising:

receiving a user operation via an operation device provided on the image forming apparatus, receiving information from an extraneous source via a network, wherein the storing includes:

storing in the memory, at least one of the plurality of print conditions having been set at the image forming apparatus based on information input via the operation device, and storing, in the memory, at least one of the plurality of print conditions having been set at the extraneous source based on the information input via the interface, the at least one of the plurality of print conditions set at the image forming apparatus being different than the at least one of the plurality of conditions set at the extraneous source.

11. A non-transitory recording medium which, when executed by one or more processors on an image forming apparatus, cause the processors to perform an image forming method comprising:

storing, in a memory of the image forming apparatus, a plurality of print conditions set for each of a plurality of direct printing methods, the plurality of print conditions including at least one of toner saving, number of pages, duplex printing, aggregation processing, monochrome printing, color printing or reverse order processing;

receiving print information on printing to be performed, the print information at least indicating image data to be printed and a direct printing method;

identifying the direct printing method from the print information;

acquiring from the memory at least one print condition corresponding to the identified direct printing method; and printing based on image data according to the acquired print condition, wherein the print information designates at least one print condition, the method further comprising;

discarding the at least one print condition designated by the print information;

preferentially acquiring the at least one print condition stored in the memory; and executing printing using the preferentially acquired at least one print condition.

* * * * *